(12) United States Patent
Urakami

(10) Patent No.: US 6,913,524 B2
(45) Date of Patent: Jul. 5, 2005

(54) SUCTION DEVICE PROVIDED WITH NEGATIVE PRESSURE REGULATING MECHANISM

(76) Inventor: Fukashi Urakami, 608 Maruyoshi Bldg., 17-24, Konandai 4-chome, Konan-ku, Yokohama-shi, Kanagawa, 234-0054 (JP)

( * ) Notice: Subject to any disclaimer, the term of this patent is extended or adjusted under 35 U.S.C. 154(b) by 71 days.

(21) Appl. No.: 10/203,048

(22) PCT Filed: Feb. 2, 2001

(86) PCT No.: PCT/JP01/00731

§ 371 (c)(1), (2), (4) Date: Aug. 1, 2002

(87) PCT Pub. No.: WO01/56868

PCT Pub. Date: Aug. 9, 2001

(65) Prior Publication Data

US 2003/0027508 A1 Feb. 6, 2003

(30) Foreign Application Priority Data

Feb. 4, 2000 (JP) ........................................ 2000-027784

(51) Int. Cl.⁷ ................................................ B24C 9/00
(52) U.S. Cl. ........................................ 451/88; 269/21
(58) Field of Search .................... 451/88, 67, 285–288, 451/279, 339, 388; 269/21

(56) References Cited

U.S. PATENT DOCUMENTS 1,323,843 A 12/1919 Curtiss
3,788,010 A * 1/1974 Goff ............................. 451/88
4,095,378 A * 6/1978 Urakami ...................... 451/88
5,291,692 A * 3/1994 Takahashi et al. .......... 451/388
6,152,808 A * 11/2000 Moore ......................... 451/60
6,210,260 B1 * 4/2001 Tanaka et al. .............. 451/289
6,517,420 B2 * 2/2003 Ishikawa et al. ............. 451/67

FOREIGN PATENT DOCUMENTS

JP 2000-006860 1/2000

* cited by examiner

Primary Examiner—Lee D. Wilson
(74) Attorney, Agent, or Firm—Hogan & Hartson, LLP

(57) ABSTRACT

The invention comprises a suction housing connected to a negative pressure forming means to suck in fluids, a suction opening member mounted on the suction housing, a part of which is caused to contact the surface of an object, and which defines a pressure-reduced area together with the suction housing and the surface of an object, and a means for maintaining the distance between the suction housing and the surface of an object at a predetermined distance, wherein the suction opening member and the surface of an object where in contact with each other are caused to be detached from each other partially or entirely due to the increase in the fluid pressure difference between the inside and the outside of the pressure-reduced area, resulting in the communication between the inside and the outside of the pressure-reduced area, allowing the outside fluid to flow into the pressure-reduced area.

20 Claims, 20 Drawing Sheets

SUCTION DEVICE PROVIDED WITH NEGATIVE PRESSURE REGULATING MECHANISM

TECHNICAL FIELD

This invention relates to a device adhering or attempting to adhere to the surface of an object when negative pressure is formed internally, and having a mechanism which adjusts such negative pressure by taking in an ambient fluid such as air or water.

The present invention also relates to a device adhering to the surface of an object when negative pressure is formed internally and moving along such surface, and having a mechanism which adjusts such negative pressure by taking in an ambient fluid such as air or water.

The present invention further relates to a device sucking in materials which exist on the surface of an object when negative pressure is formed internally, and having a mechanism which adjusts such negative pressure by taking in an ambient fluid such as air or water.

PRIOR ART

An example of those devices that adhere or attempt to adhere to surfaces when negative pressure is formed internally or those devices that adhere to and move along surfaces when negative pressure is formed internally includes the one described below:

A device capable of adhering to and moving along various inclined or substantially vertical surfaces of ships, buildings, etc. was disclosed in patent application Ser. No. 60-26752 (U.S. Pat. No. 4,095,378 Claims and Drawings).

The device comprises a suction housing; a plurality of wheels secured to such suction housing as a means for mobility; a suction opening member connected to such suction housing having a free end which is caused to contact the surface of an object; a negative pressure forming means to discharge externally the fluid contained in a pressure-reduced area defined by said suction housing, said surface and said suction opening member; and a relief valve which maintains vacuum pressure at a constant level, generally called a vacuum breaker, to maintain the value of such negative pressure at a predetermined level by allowing an ambient fluid to flow into such pressure-reduced area if and when the negative pressure inside such pressure-reduced area exceeds such predetermined level.

In such a device, the energization of the negative pressure forming means causes the fluid inside the pressure-reduced area to be discharged externally, and the pressure of the fluid which acts on the suction housing due to the fluid pressure difference between the inside and the outside of the pressure-reduced area is caused to be transmitted to the surface of an object via the wheels, such fluid pressure allowing the device to adhere to the surface. Additionally, the rotation of the wheels by way of a driving means, such as an electric motor, during such adhesion state allows the device to move along the surface due to the action of such wheels.

Further, such a device has a remote-controlled working device, such as a means for blasting abrasives against the surface inside the pressure-reduced area mounted thereon, so as to allow various operations on the surface of an object in a safe and efficient manner.

A more detailed explanation of the purpose of the vacuum breaker on the aforesaid device follows. If the negative pressure inside the pressure-reduced area exceeds a predetermined value, the adhesive power of said device to the surface of an object becomes excessive, causing destruction due to a lack of mechanical strength thereof. If the negative pressure inside said pressure-reduced area exceeds a predetermined value, the negative pressure of the negative pressure forming means will also increase, and, characteristically of said negative pressure forming means, the increase in negative pressure necessarily decreases the amount of the fluid sucked in, resulting in the decrease in the amount of the fluid reaching said negative pressure forming means from said pressure-reduced area. In case of such a device having a means for blasting abrasives against the surface of an object mounted thereon, the abrasives after being blasted is suction-transported by the flow of the fluid reaching the negative pressure forming means from the pressure-reduced area, and the abrasives is separated and collected by a powder and granular material separating means installed at the upstream side of the negative pressure forming means. In such a device, if the amount of the fluid decreases, the amount of abrasives which can be suction-transported decreases correspondingly, resulting in lowered performance efficiency of such device.

As understandable from the above explanation, the purpose of a vacuum breaker on such a device is to prevent the destruction of the device caused by excessive negative pressure and to prevent the decrease in the amount of the fluid which flows to the negative pressure forming means from the pressure-reduced area.

The above-described conventional device has the following problems to be solved.

With respect to the traditional device, a vacuum breaker is installed on the suction housing and, if and when the negative pressure inside the pressure-reduced area exceeds a predetermined level, the ambient fluid flows into the pressure-reduced area through the vacuum breaker to maintain the negative pressure at the predetermined level. However, the flow of the fluid which flows from the vacuum breaker and reaches the negative pressure forming means via the interior of the suction housing is not necessarily an effective flow of the fluid to effectively suction-transport powder and granular materials, such as abrasives, existing on the surface; As easily understood in case of such surface of an object being a floor surface, the flow of the fluid which flows from the vacuum breaker and reaches the negative pressure forming means via the interior of the suction housing does not contribute much to the suction-transportation of powder and granular materials, such as abrasives, existing on the surface. Effective suction-transportation of powder and granular materials, such as abrasives, existing on the surface of an object requires that the fluid actually flows through the location of such material and moves such material with wind pressure.

Additionally, in case of the surface of an object made of extremely smooth material, such as sheet glass, a suction opening member made of non-air-permeable material, such as rubber, will adhere to the surface gap-free, causing the entire flow of the fluid which flows from outside the suction device to the negative pressure forming means through the interior of such suction device to flow from a vacuum breaker. In such a case, no material clinging to the surface outside the pressure-reduced area and desired to be suction-transported is allowed to be suction-transported nor is it allowed to enter the inside of the pressure-reduced area, even if such material is in a powder form. An exception is when the suction opening member is made of air permeable material, such as a brush. It is extremely difficult, however, to have a brush to be equipped with a negative pressure adjustment function, such as that of a vacuum breaker.

Additionally required of the traditional device is the use of a large vacuum breaker when the fluid sucking capacity of a negative pressure forming means is considerably great. The reason is as follows. In order to prevent the negative pressure in the pressure-reduced area from becoming excessive, the amount of the fluid which flows through a vacuum breaker needs to be increased. In order to achieve this, needed is a large vacuum breaker having a large passage valve. A large vacuum breaker necessarily makes a device larger and causes the manufacturing cost thereof to increase.

Accordingly, it is a primary technical objective of this invention to provide a suction device capable of causing the entire flow of a fluid which flows from outside the suction device, through the interior thereof and to a negative pressure forming means to pass extremely close to the surface of an object, thereby effectively suction-transporting materials existing on the surface, whether existing inside or outside a pressure-reduced area, and further to provide a suction device which does not require a large vacuum breaker.

Certain problems associated with prior art and attempted to be solved by the present invention were discussed above with respect to devices which adhere to or attempt to adhere to surfaces when negative pressure is formed internally or devices which adhere to surfaces and move along such surfaces when negative pressure is formed internally.

Next, problems associated with prior art and attempted to be solved by the present invention will be discussed below with respect to devices which adhere to or attempt to adhere to surfaces when negative pressure is formed internally or devices which suck in materials which exist on surfaces when negative pressure is formed internally.

An example of those devices that adhere or attempt to adhere to surfaces when negative pressure is formed internally or those devices that suck in materials which exist on surfaces when negative pressure is formed internally is a suction nozzle used to suck in and collect powder and granular materials of higher specific gravity, such as abrasives with iron as a raw material, which exist on the surface of an object. Traditionally, in order to suck in and collect abrasives existing on the surface of an object, a suction nozzle connected via suction hose to a negative pressure forming means is held by an operator and the suction opening of such suction nozzle is thrust into the abrasives. If a great quantity of abrasives is sucked in at one time, however, such material becomes blocked up inside the suction hose, resulting in a drastic decrease in the flow of the fluid which flows from outside such suction nozzle, through the interior of the suction nozzle and the suction hose and to the pressure reduction forming means, frequently causing difficulties in the suction and collection of the abrasives.

Accordingly, it is a technical objective of this invention to provide a suction device capable of causing the suction opening member to be detached, due to the increase in the negative pressure inside the suction nozzle or the suction device, from the surface of an object, or the surface of the material to be suction-transported, before such material to be suction-transported becomes blocked up in the midst of the transportation route, in order to stop the excessive flow of the material into the suction opening member, thereby allowing effective suction-transportation of the material, and further to provide a suction device capable of causing the entire flow of the fluid which flows from outside the suction device, through the interior thereof and reaches a negative pressure forming means to pass extremely close to the surface of the material to be suction-transported, thereby allowing more effective suction-transportation of the material.

SUMMARY OF THE INVENTION

Provided according to the present invention in order to solve the technical problems described above is a suction device comprising: a suction housing connected to a negative pressure forming means to suck in a fluid; a suction opening member installed on said suction housing, a part of which is caused to contact the surface of an object, and which defines a pressure-reduced area together with said suction housing and said surface; and, a means for maintaining the distance between said suction housing and said surface at a predetermined distance; said suction device having a negative pressure adjusting means whereby the suction opening member and the surface where in contact with each other become detached from each other partially or entirely due to the increase in the fluid pressure difference between the inside and the outside of said pressure-reduced area, resulting in the communication of the inside and the outside of said pressure-reduced area, allowing the outside fluid to flow into said pressure-reduced area.

According to the device of the present invention, the energization of the negative pressure forming means causes the fluid inside the pressure-reduced area to be sucked in, resulting in the increase in the negative pressure of the inside of the pressure-reduced area, and, due to such increase in the negative pressure, the suction opening member and the surface where in contact with each other become detached from each other partially or entirely, resulting in the communication between the inside and the outside of the pressure-reduced area, allowing the outside fluid to flow into the pressure-reduced area, stopping the increase in the negative pressure inside the pressure-reduced area, thereby maintaining the negative pressure at a constant level.

Further according to the device of the present invention, the suction opening member has the function of a valve, and because the cross-sectional area of the passage as a valve may be enlarged greatly, the suction opening member itself can be said to have a negative pressure adjusting capacity similar to that of a large vacuum breaker. According to the present invention, therefore, devices may be made smaller and lighter and the manufacturing cost thereof lower, compared to traditional devices which use large vacuum breakers.

DETAILED DESCRIPTIONS OF PREFERRED EMBODIMENTS

Figure 1:
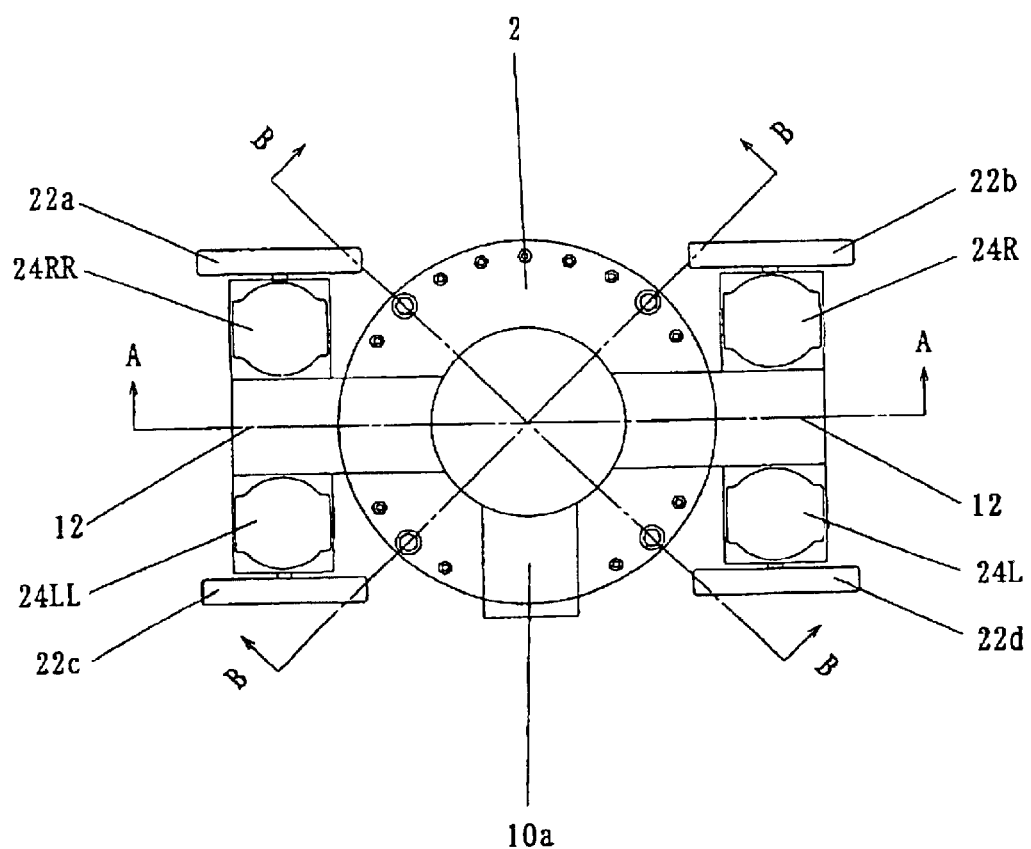
FIG. 1 is a top view of the first-most preferred embodiment of the device configured according to the present invention.
Figure 2:
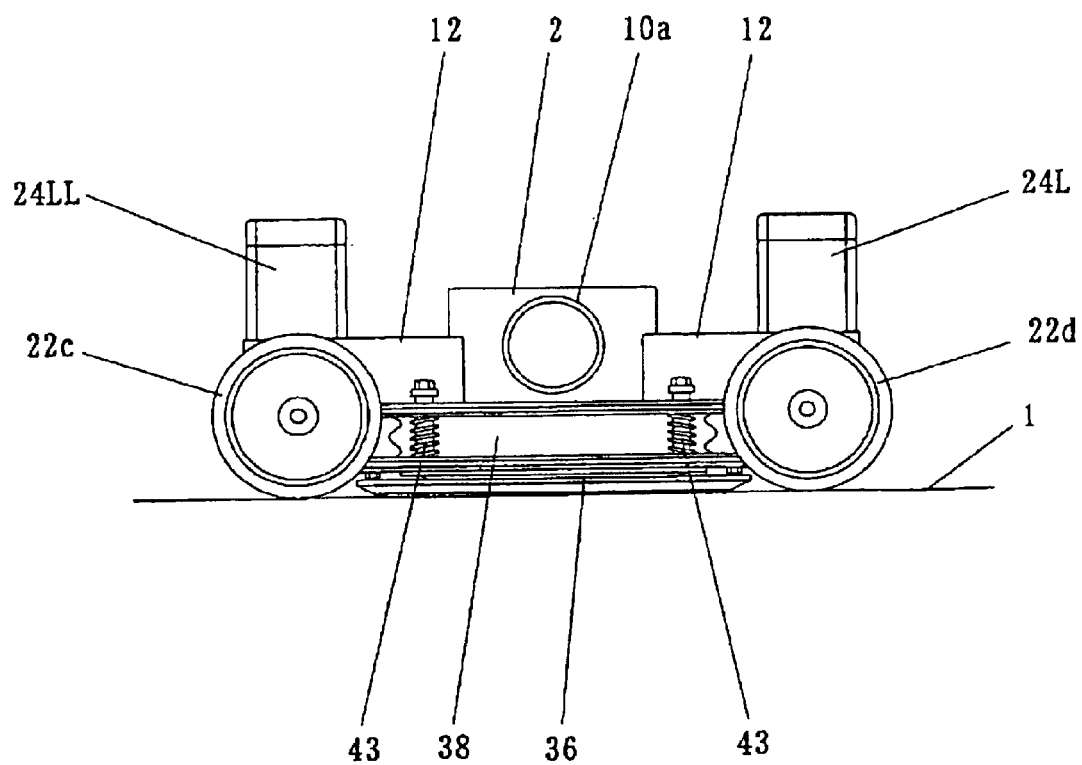
FIG. 2 is a side view of the bottom of the device shown in FIG. 1
Figure 3:
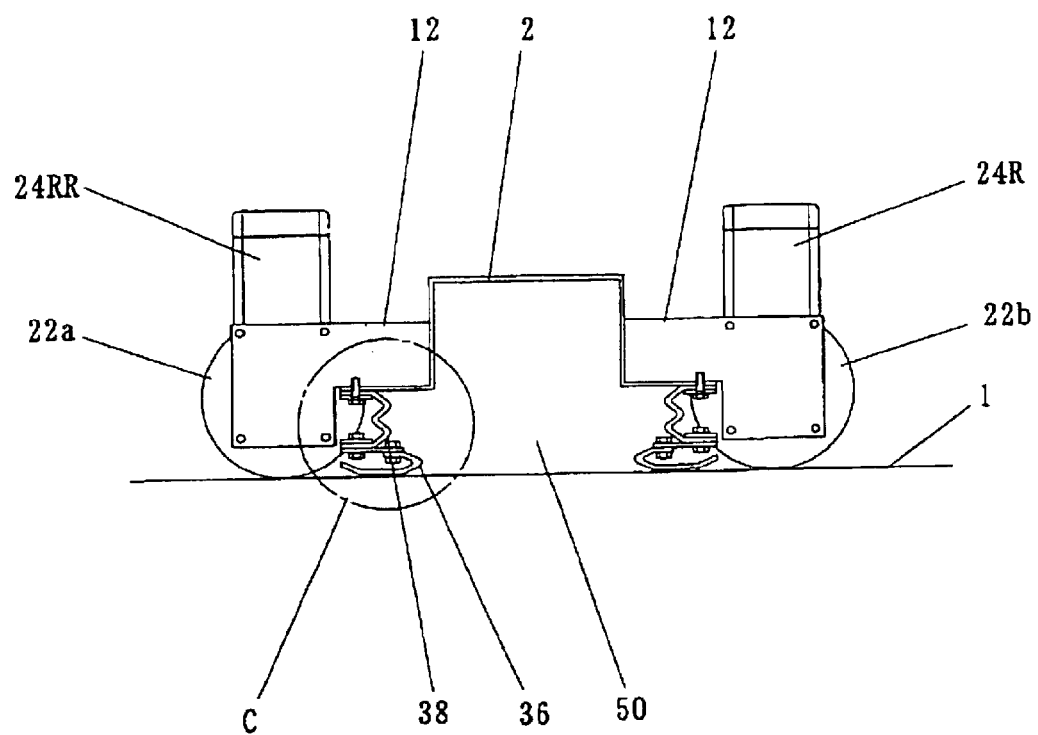
FIG. 3 is a sectional view along the line A—A of the device shown in FIG. 1.
Figure 4:
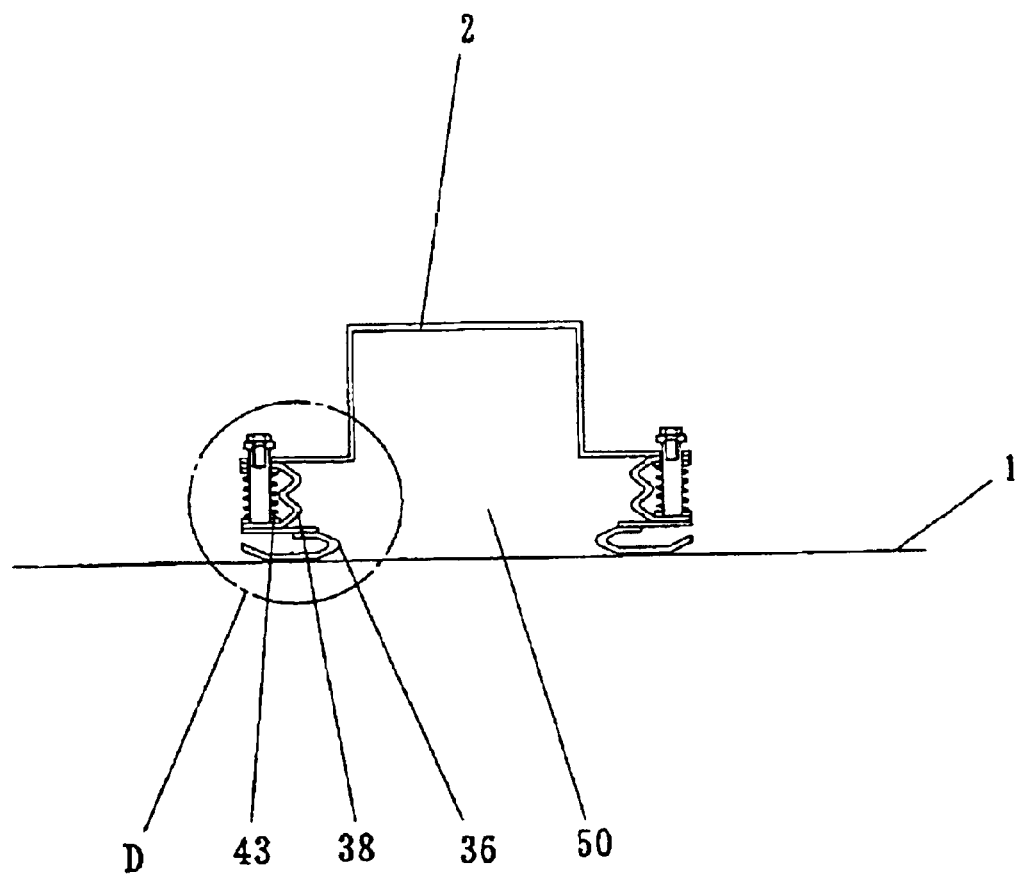
FIG. 4 is a sectional view along the line B—B of the device shown in FIG. 1.
Figure 5:
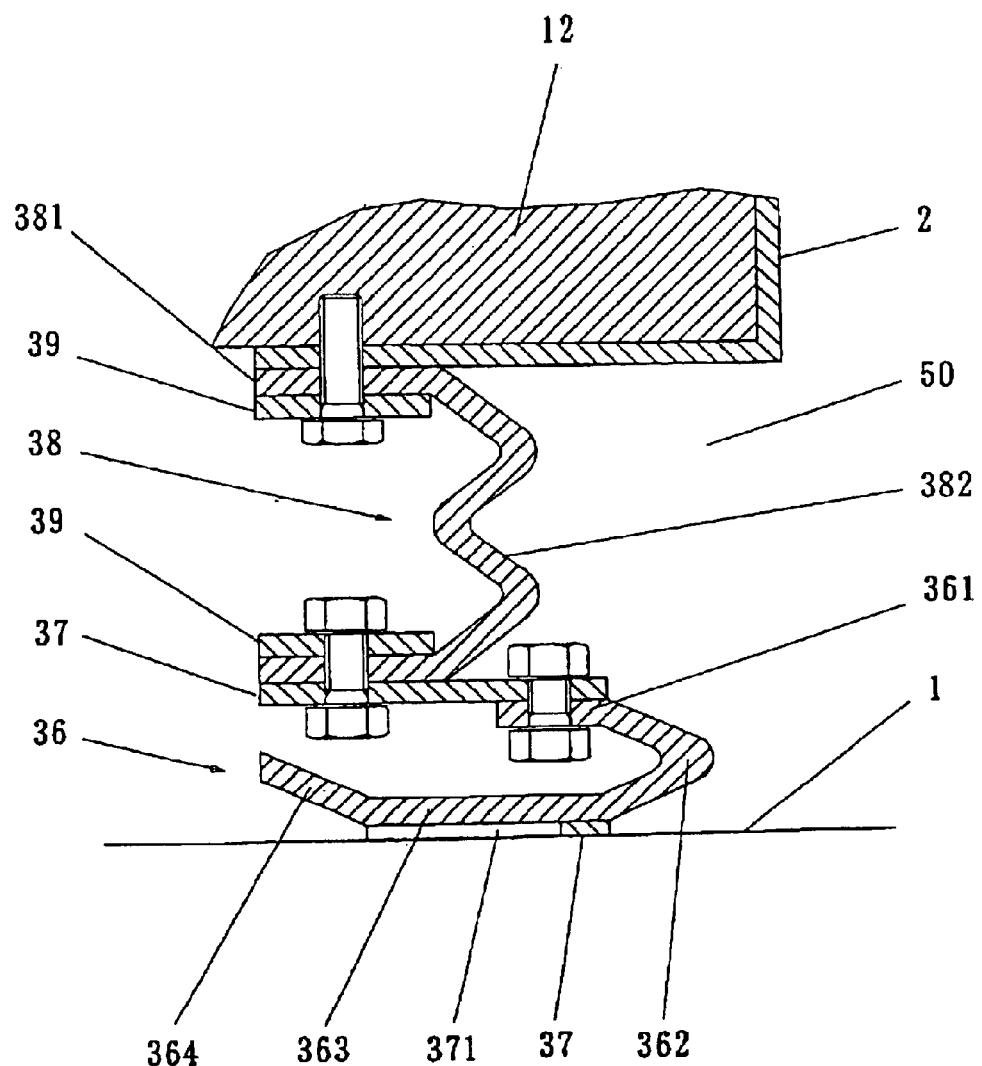
FIG. 5 is an enlarged sectional view of the area C of the device shown in FIG. 3.
Figure 6:
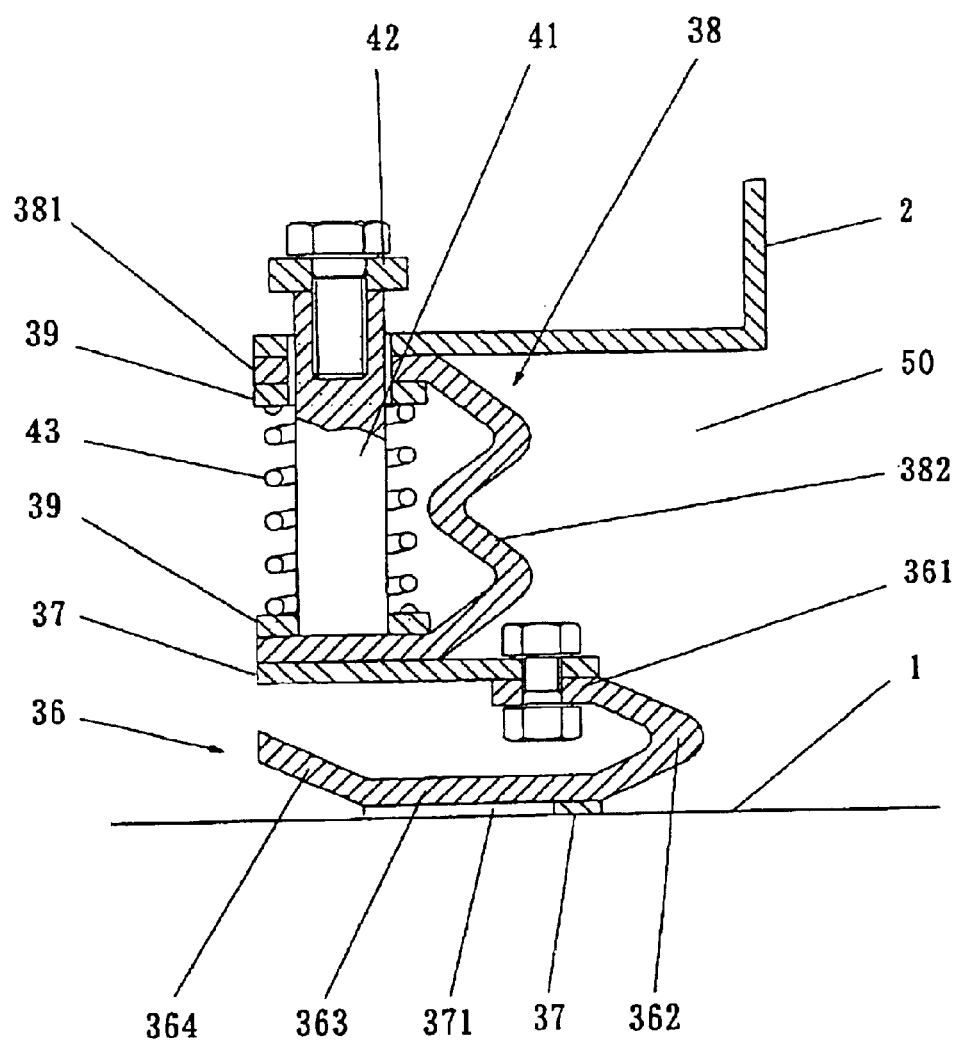
FIG. 6 is an enlarged sectional view of the area D of the device shown in FIG. 4.
Figure 7:
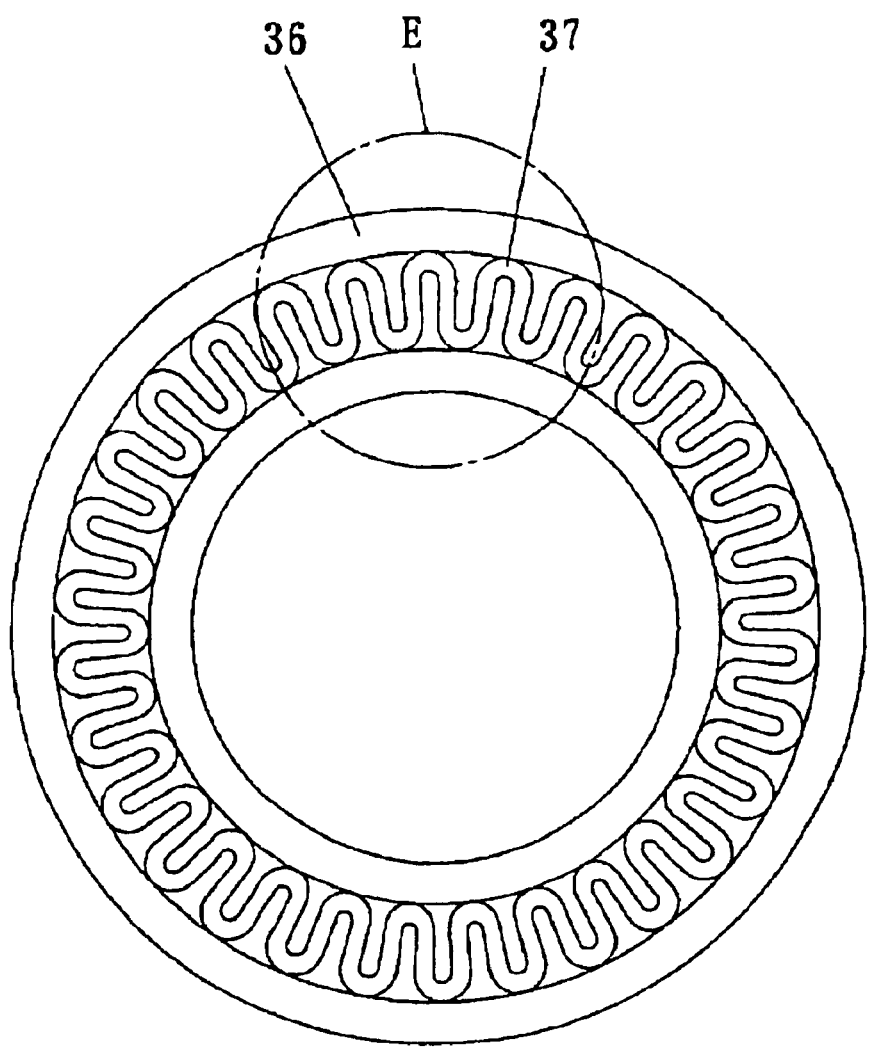
FIG. 7 is a top view of the first embodiment of the suction opening member of the device shown in FIG. 1, seen from the surface side of an object.

Preferred embodiments of the device configured according to the present invention will be described in detail below, referring to the figures attached hereto.

In reference to FIG. 1 through FIG. 12, the device illustrated therein has the suction housing 2, said suction housing 2, made of a rigid material, made up of a cylinder with one end opened and a ring-shaped disk welded onto the outer periphery of such opening of the cylinder.

Welded onto one side of the suction housing 2 is the connecting pipe 10a, said connecting pipe 10a being connected to a negative pressure forming means (not illustrated), such as a vacuum pump, via flexible suction hose (not illustrated).

Welded onto the sides of the suction housing 2 are two sets of installation members for electric motors with reduction gears 12, made of a rigid material.

Mounted on each of the two sets of installation members for electric motors with reduction gears 12 are the electric motor with a reduction gear 24RR having the driving wheel 22a on the driving shaft thereof and the electric motor with a reduction gear 24LL having the driving wheel 22c on the driving shaft thereof, on the one hand, and the electric motor with a reduction gear 24R having the driving wheel 22b on the driving shaft thereof, and the electric motor with a reduction gear 24L having the driving wheel 22d on the driving shaft thereof, on the other hand.

Mounted on the outer periphery of the disk of the suction housing 2 is the bellows 38 of the overall approximate shape of a ring made of a relatively flexible material, such as polyurethane rubber or plastic, using bolts and nuts and utilizing the ring-and-disk-shaped binder made of a rigid material 39 as a supplementary fastening means. The bellows 38 comprises the flanges 381 made on both ends of the bellows 38 and the main part of the bellows 382.

Mounted on the bellows 38 is the outer periphery of the movable pressure-receiving member 37, which is a ring-shaped disk made of a rigid material, using a bolt and nuts and utilizing the binder made of a rigid material 39, which is a ring-shaped disk, as a supplementary fastening means.

Welded onto the binder 39 located on the side where the movable pressure-receiving members 37 is located are four guide pins 41, said four guide pins each inserted into each of the four holes made on the disk of the suction housing 2, the flange 381 located on the side where said disk is located, and the binder 39 in a freely slidable manner. Additionally, four compressed coil springs 43 are inserted in the guide pins 41 between the two binders 39. Fixed onto the guide pins 41 with bolts are the end plates 42 which have the function of a stopper.

Mounted at the inner periphery of the movable pressure-receiving member 37 is the suction opening member 36, made of a relatively flexible material, such as polyurethane rubber or plastic, with bolts and nuts. The suction opening member 36, which has the overall approximate shape of a ring-shaped disk, comprises the flange 361, the bellows 362 consisting of the upper wall which extends from the flange 361 toward the surface of an object 1 and toward the inside of the pressure-reduced area 50 and the lower wall which extends from said upper wall toward the surface of an object 1 and toward the outside of the pressure-reduced area 50, the main part 363 which extends from the bellows 362, along the surface of an object 1 and toward the outside of the pressure-reduced area 50, and the extension 364 which extends from the main part 363 away from the surface of an object 1 and toward the outside of the pressure-reduced area 50.

The suction opening member 36, together with the suction opening 2, the bellows 38, the movable pressure-receiving member 37 and the surface of an object 1, defines the pressure-reduced area 50.

Figure 8:
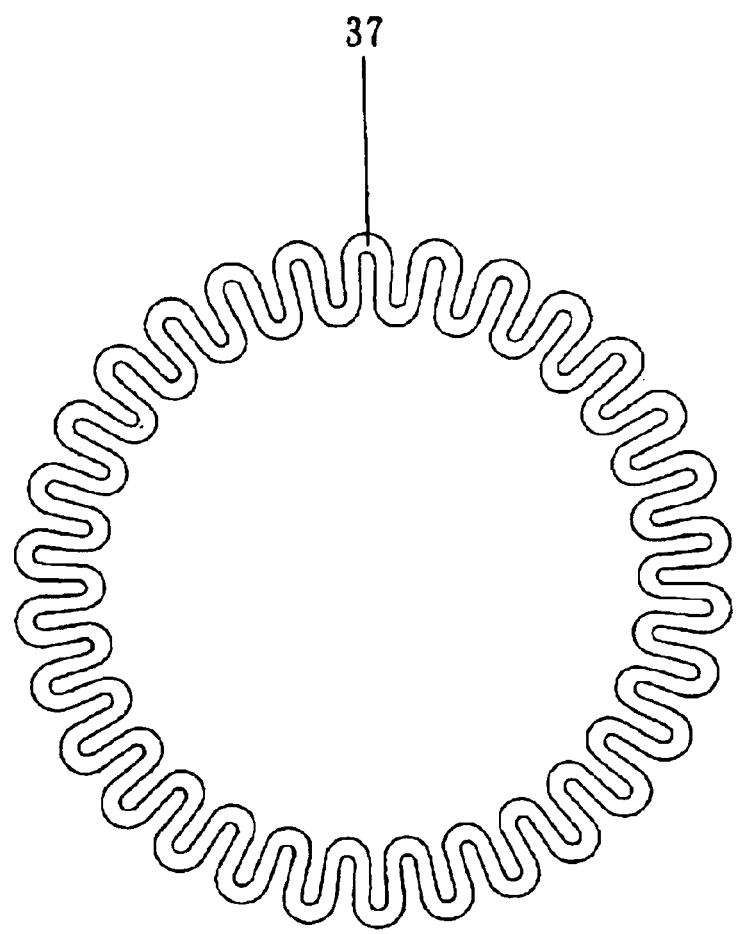
FIG. 8 is a top view of the groove-forming member to be pasted onto the suction opening member of FIG. 7.
Figure 9:
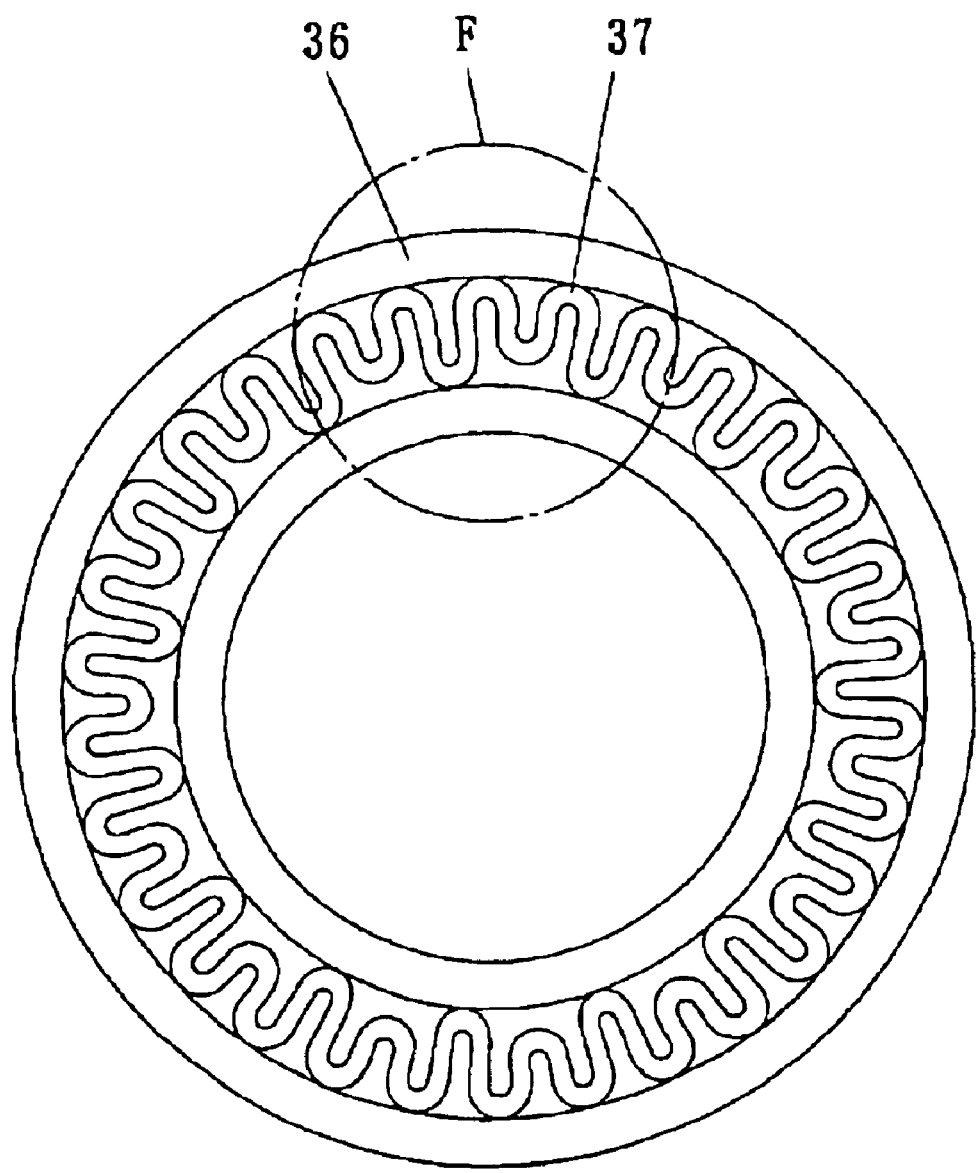
FIG. 9 is a top view of the second embodiment of the suction opening member of the device shown in FIG. 1, seen from the surface side of an object.
Figure 10:
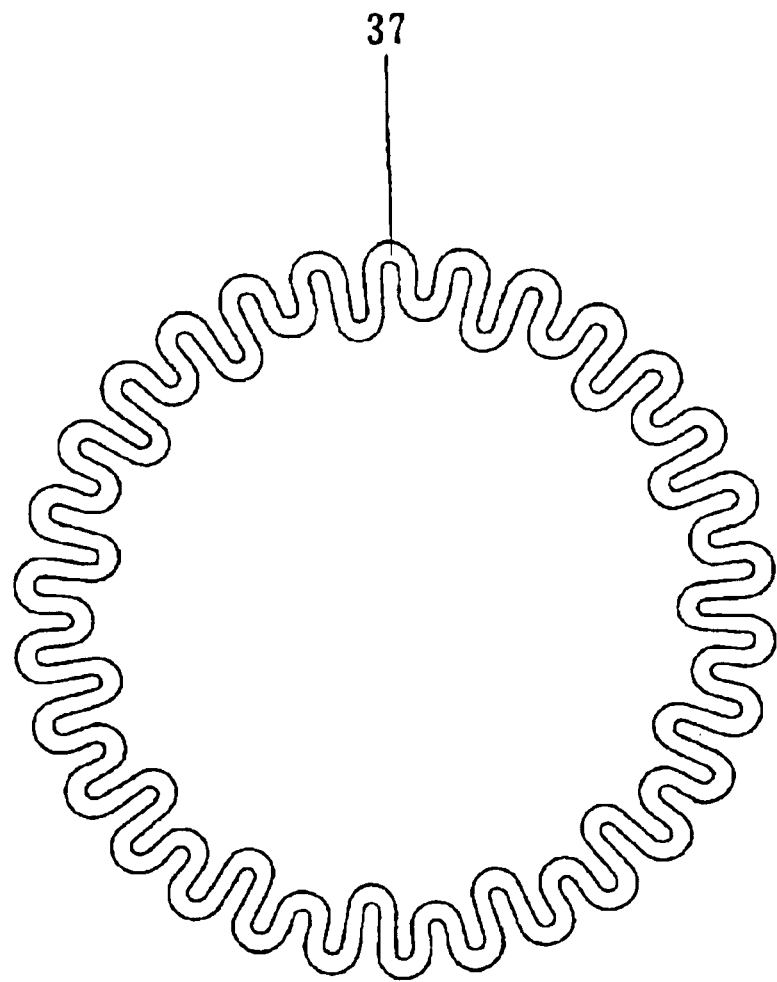
FIG. 10 is a top view of the groove-forming member to be pasted onto the suction opening member of FIG. 9.

Pasted onto the area which faces the surface of an object 1 of the main part 363 of the suction opening member 36 is a sheet-shaped groove-forming member 37 of the shape shown in FIG. 8 or FIG. 10, made of a material with a low coefficient of friction, such as ultrahigh molecular polyethylene. By way of the groove-forming member 37 being pasted onto the main part 363, the area which faces the surface of an object 1 of the main part 363 of the suction opening member 36 is caused to form alternately the groove 371 which communicates with the outside of the pressure-reduced area 50 and the groove 372 which communicates with the inside of the pressure-reduced area 50.

The groove 371 which communicates with the outside of the pressure-reduced area 50 has the effect of allowing the fluid outside the pressure-reduced area 50 to flow into the pressure-reduced area 50. The groove 372, which is constantly in the state of negative pressure, has the effect of allowing the pressure of the fluid outside the pressure-reduced area 50 to constantly push the main part 363 against the surface of an object 1.

In regards to the difference between the groove-forming member 37 shown in FIG. 8 and the groove-forming member 37 shown in FIG. 10, the groove-forming member 37 shown in FIG. 8 has grooves 371, all of the same shape whereas the groove-forming member 37 shown in FIG. 10 has two different lengths of grooves arranged alternately.

Additionally, by changing the thickness of the material of the sheet for the groove-forming member 37, the depth of the grooves may easily be changed to any desired depth, allowing the selection of a desired depth of the grooves in accordance with the suction capacity of the negative-pressure forming means.

Furthermore, the groove-forming member 37, when worn down causing the depth of the grooves to decrease, may be changed to a new groove-forming member 37, easily restoring the depth of the grooves.

Actions and effects of the device described above will be explained below.

When the electric motors with reduction gears 24L, 24LL, 24R and 24RR are operated to rotate and drive the driving wheels 22d, 22c, 22b and 22a in the same direction, the device will move straight (forward or backward) along the surface of an object 1. When the driving wheels 22d and 22c, on one hand, and the driving wheels 22b and 22a, on the other hand, are rotated and driven to opposite directions, the device will turn (left or right).

When the negative pressure forming means (not illustrated) is energized, the fluid, such as air, inside the pressure-reduced area 50 becomes discharged externally through the connecting pipe 10a and suction hose (not illustrated), resulting in the desired reduction of the pressure of the pressure-reduced area 50.

When the pressure is so reduced of the pressure-reduced area 50, the pressure of the ambient fluid, such as air, which acts on the suction housing 2 due to the fluid pressure difference between the inside and the outside of the pressure-reduced area 50, is transmitted to the surface of an object 1 via the two sets of installation members 12 for the electric motors with reduction gears, the four sets of electric motors with reduction gears 24R, 24L, 24RR and 24LL and the four sets of driving wheels 22a, 22c, 22b and 22d, causing the device to suction-adhere to the surface of an object 1 due to the pressure of the ambient fluid.

While the pressure of the inside of the pressure-reduced area 50 is maintained at a desired level, the main part 363 of the suction opening member 36 is forced to be in firm contact with the surface of an object 1 by the pressure of the outside of the pressure-reduced area 50, thereby stopping as much as possible the fluid outside the pressure-reduced area 50 from flowing internally.

Many grooves are formed in the area of the main part 363 which faces the surface of an object 1. More specifically, the groove 371 which communicates with the outside of the pressure-reduced area 50 and the groove 372 which communicates with the inside of the pressure-reduced area 50 are formed alternately. The groove 372 is constantly in the state of negative pressure, and therefore, the main part 363 is necessarily pushed against the surface of an object 1 by the pressure of the fluid outside the pressure-reduced area 50.

The movable pressure-receiving member 37 is forced to move away from the surface of an object 1 by the pressure of the fluid outside the pressure-reduced area 50, but such movement is stopped by the compressed coil spring 43.

Figure 13:
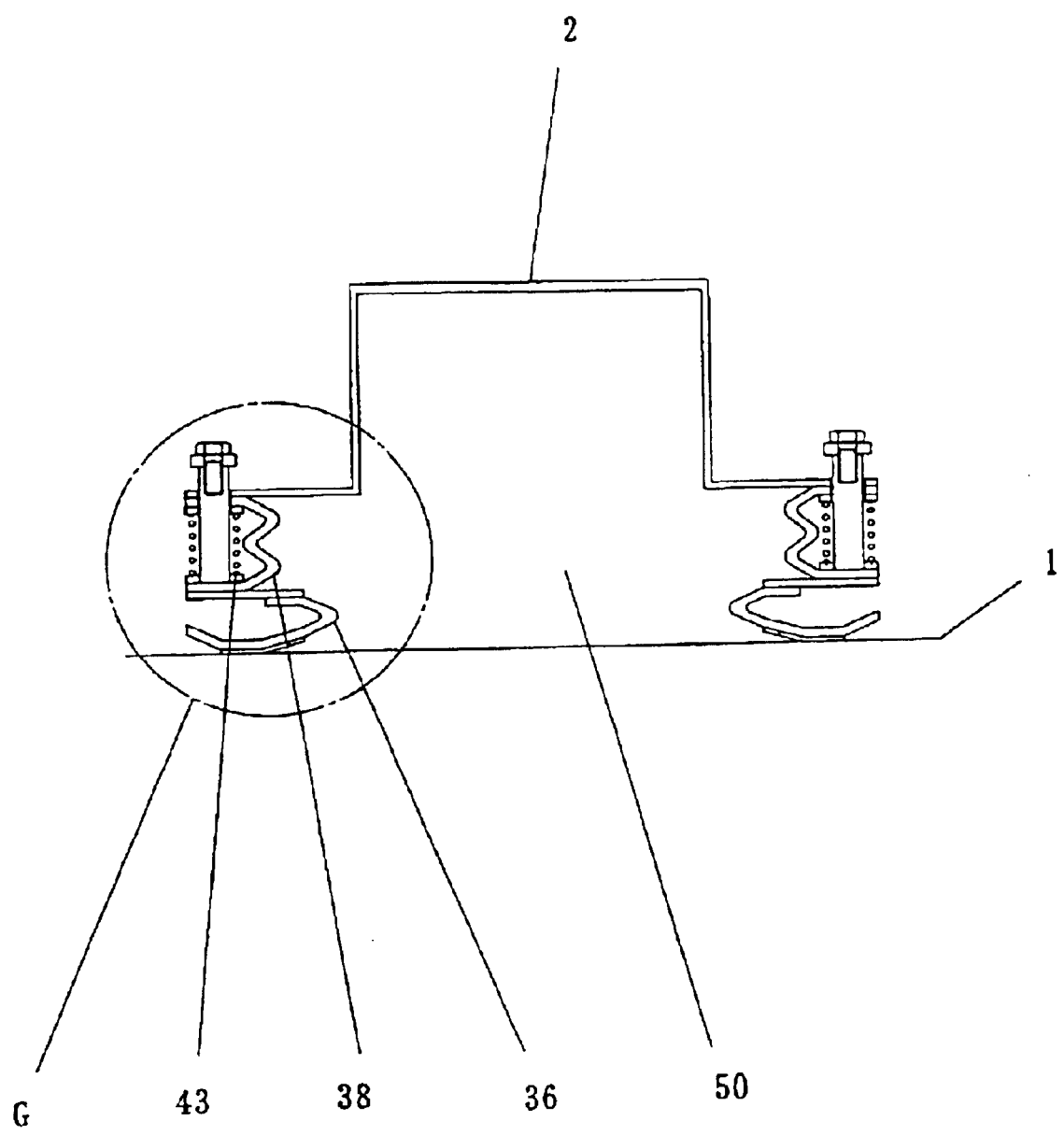
FIG. 13 is a sectional view showing the detached state of the main part of the suction opening member of the device shown in FIG. 4.
Figure 14:
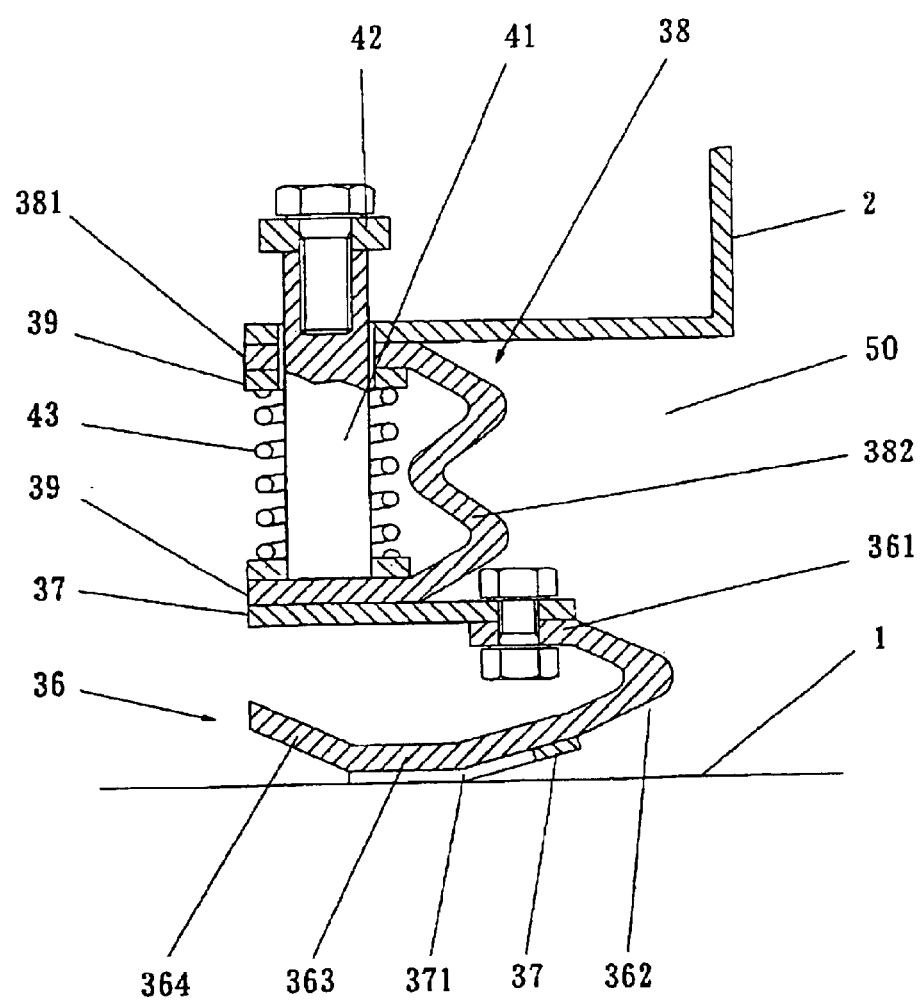
FIG. 14 is an enlarged sectional view of the area G of the device shown in FIG. 13.

Now, when the negative pressure inside the pressure-reduced area 50 increases, the movable pressure-receiving member 37 being under the force of being moved away from the surface of an object 1 by the pressure of the fluid outside the pressure-reduced area 50 receives greater force, resulting in the movable pressure-receiving member 37 overcoming the spring force of the compressed coil spring 43 and moving away from the surface of an object 1. The movable pressure-receiving member 37 then pulls the bellows 362 of the suction opening member 36 away from the surface of an object 1, finally resulting in the area of the main part 363 closest to the inside of the pressure-reduced area 50 being detached from the surface of an object 1 as is illustrated in FIG. 13 and FIG. 14, causing the fluid outside the pressure-reduced area 50 to flow into the pressure-reduced area 50 via the groove 371, stopping the increase in the negative pressure of the inside of the pressure-reduced area 50. When the pressure of the inside of the pressure-reduced area 50 returns to the desired level, the movable pressure-receiving member 37 moves toward the surface of an object 1 by the spring force of the compressed coil pressure 43, and the suction opening member 36 returns to the same state as when the pressure of the inside of the pressure-reduced area 50 was maintained at the desired level.

Figure 15:
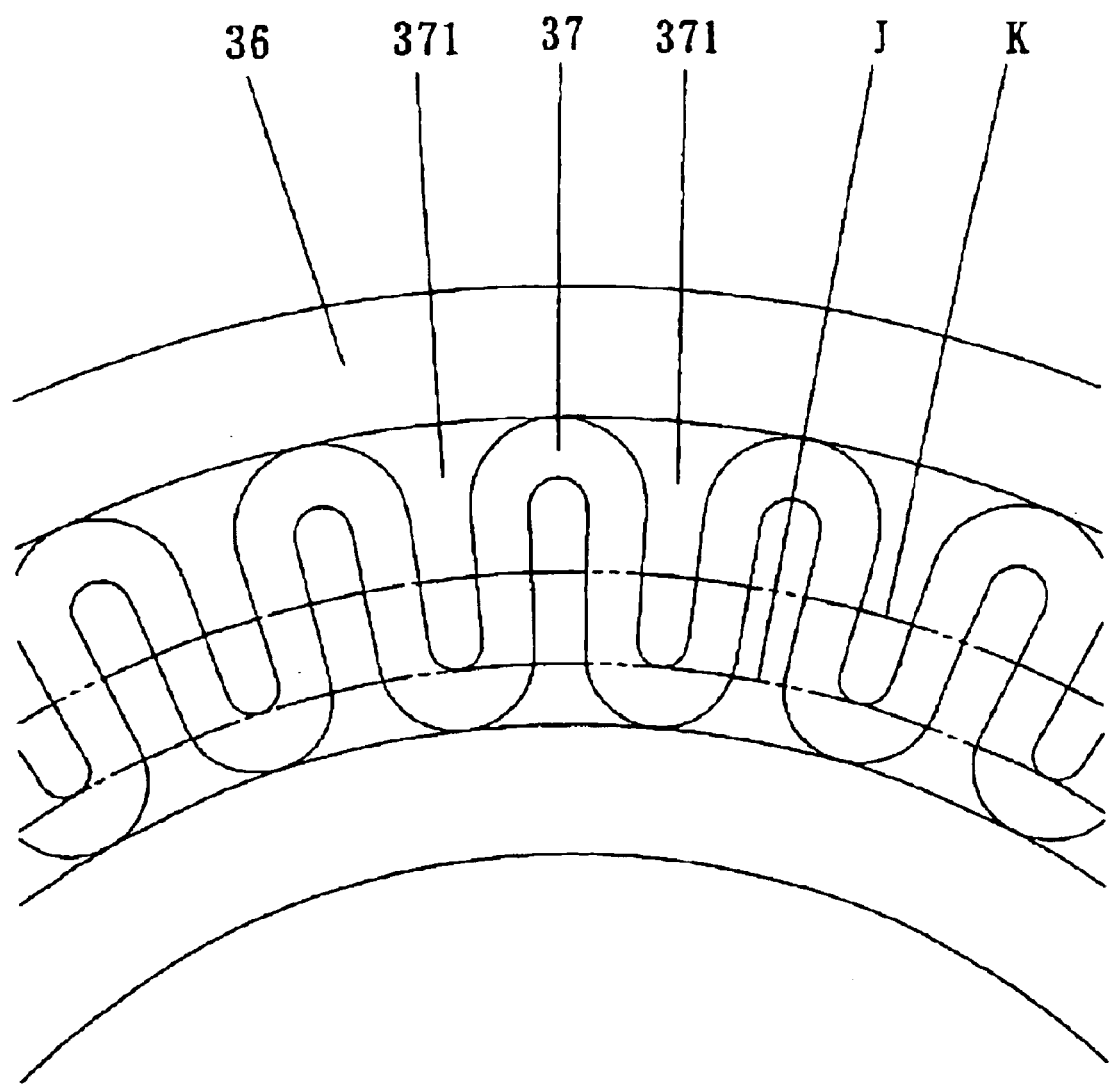
FIG. 15 shows the border line where the main part of the suction opening member and the surface of an object begin to detach from each other in the enlarged sectional view of the area E of the fist embodiment of the suction opening member shown in FIG. 11.

In FIG. 15, the two-dot chain lines J and K show the borderlines where the main part 363 and the surface of an object 1 begin to detach from each other. When the border line is J when the main part 363 and the surface of an object 1 begin to detach from each other, the groove 371 is not yet in communication with the inside of the pressure-reduced area 50, and the fluid outside the pressure-reduced area 50 does not flow inside the pressure-reduced area 50. When the border line is K when the main part 363 and the surface of an object 1 begin to detach from each other, the groove 371 is in communication with the inside of the pressure reduced area 50, and the fluid outside the pressure-reduced area 50 flows inside the pressure-reduced area 50.

Figure 16:
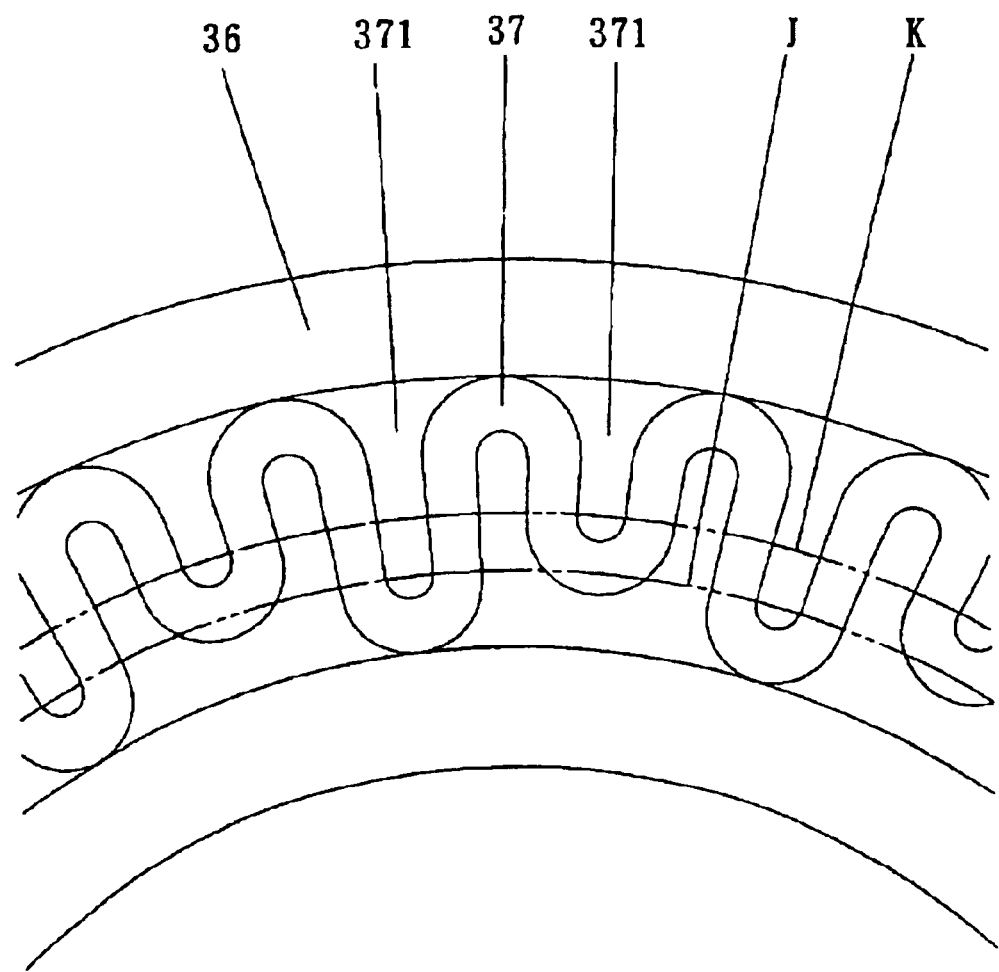
FIG. 16 shows the border line where the main part of the suction opening member and the surface of an object begin to detach from each other in the enlarged sectional view of the area F of the second embodiment of the suction opening member shown in FIG. 12.

In FIG. 16, the two-dot chain lines J and K show the borderlines where the main part 363 and the surface of an object 1 begin to detach from each other. When the border line is J when the main part 363 and the surface of an object 1 begin to detach from each other, the longer groove of the grooves of two different lengths is in communication with the inside of the pressure-reduced area 50, but the shorter groove is not yet in communication with the inside of the pressure-reduced area 50. When the border line is K when the main part 363 and the surface of an object 1 begin to detach from each other, all the grooves 371 are in communication with the inside of the pressure-reduced area 50. In other words, the amount of the fluid which flows from the outside to the inside of the pressure-reduced area 50 is greater when the border line is K when the main part 363 and the surface of an object 1 begin to detach from each other than when the border line is J when the main part 363 and the surface of an object 1 begin to detach from each other.

In other words, the shapes of the grooves illustrated in FIG. 9, FIG. 10, FIG. 12 and FIG. 16 are made in such a way that the size of the passage of the grooves 371 which connects the outside and the inside of the pressure-reduced area 50 is increased as the fluid pressure difference between the inside and the outside of the pressure-reduced area 50 increases and that the size of such passage is decreased as such increase in the fluid pressure difference is cancelled.

The grooves of the shape illustrated in FIG. 9, FIG. 10, FIG. 12 and FIG. 16 are superior to the grooves of the shape illustrated in FIG. 7, FIG. 8, FIG. 11 and FIG. 15 in the adjusting function of fine tuning the pressure of the pressure-reduced area 50. However, the choice between the grooves of the shape illustrated in FIG. 9, FIG. 10, FIG. 12 and FIG. 16 and the grooves of the shape illustrated in FIG. 7, FIG.

Figure 11:
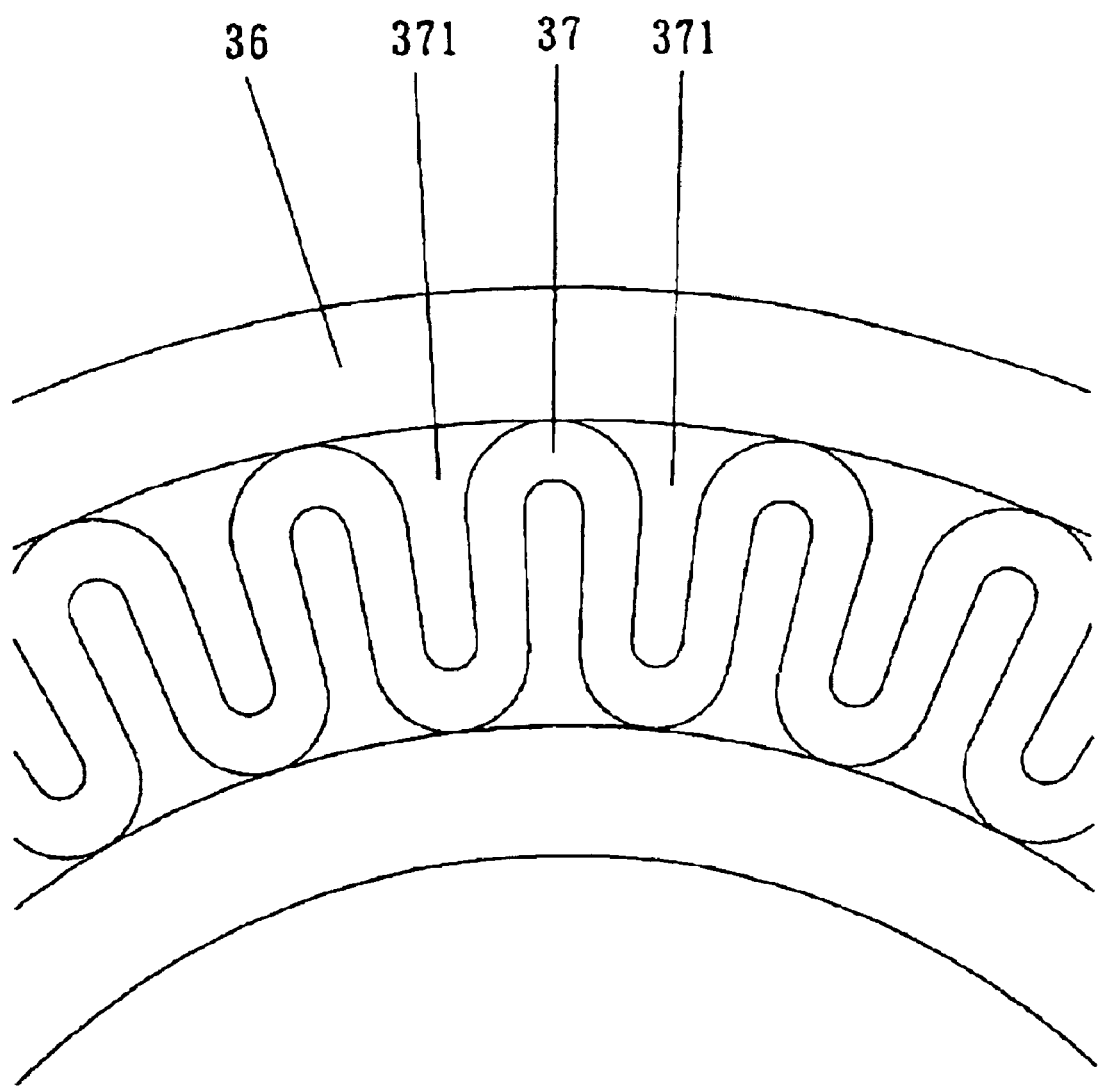
FIG. 11 is an enlarged sectional view of the area E of the first embodiment of the suction opening member shown in FIG. 7.
Figure 12:
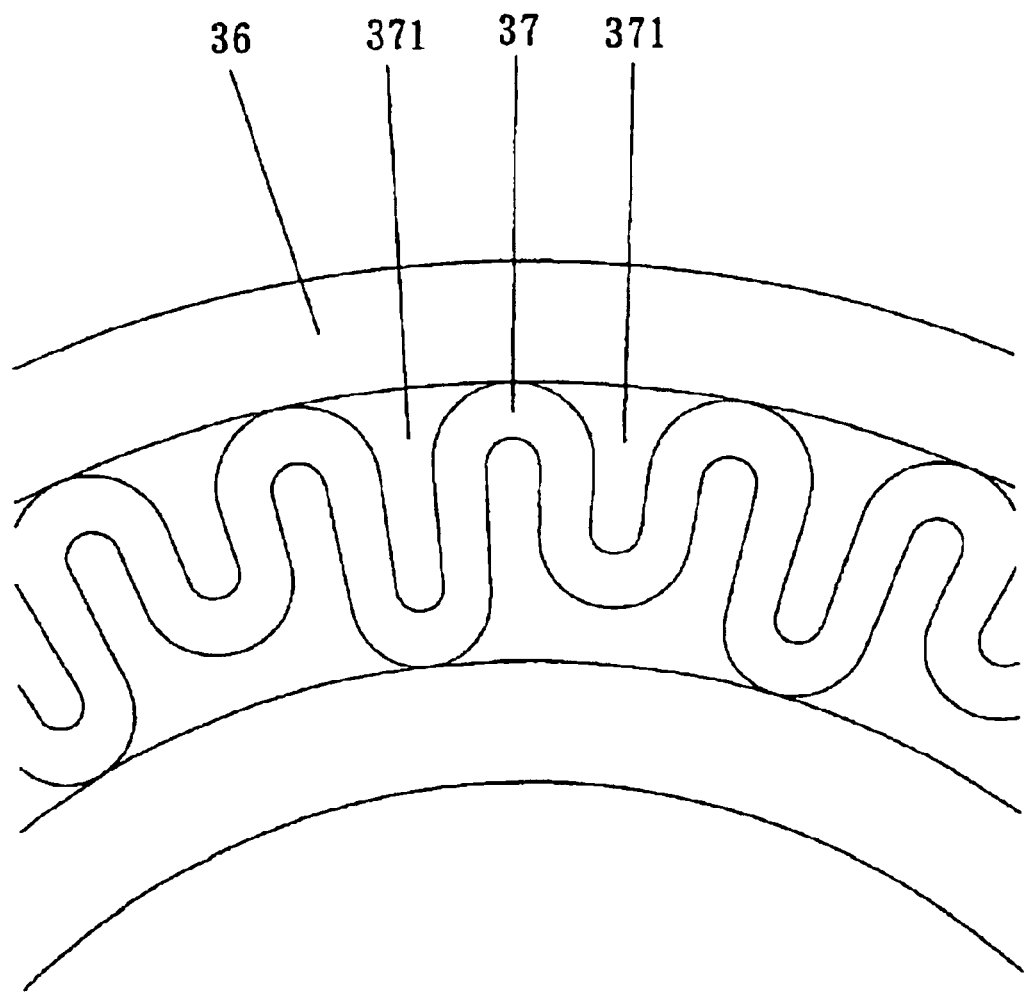
FIG. 12 is an enlarged sectional view of the area F of the second embodiment of the suction opening member shown in FIG. 9.

8, FIG. 11 and FIG. 15 depends upon the purpose of the utilization of the device of the present invention.

The most preferred embodiment of the device configured according to the present invention was described above. The second-most preferred embodiment of the device configured according to the present invention will be described below by referring to attached figures.

Figure 17:
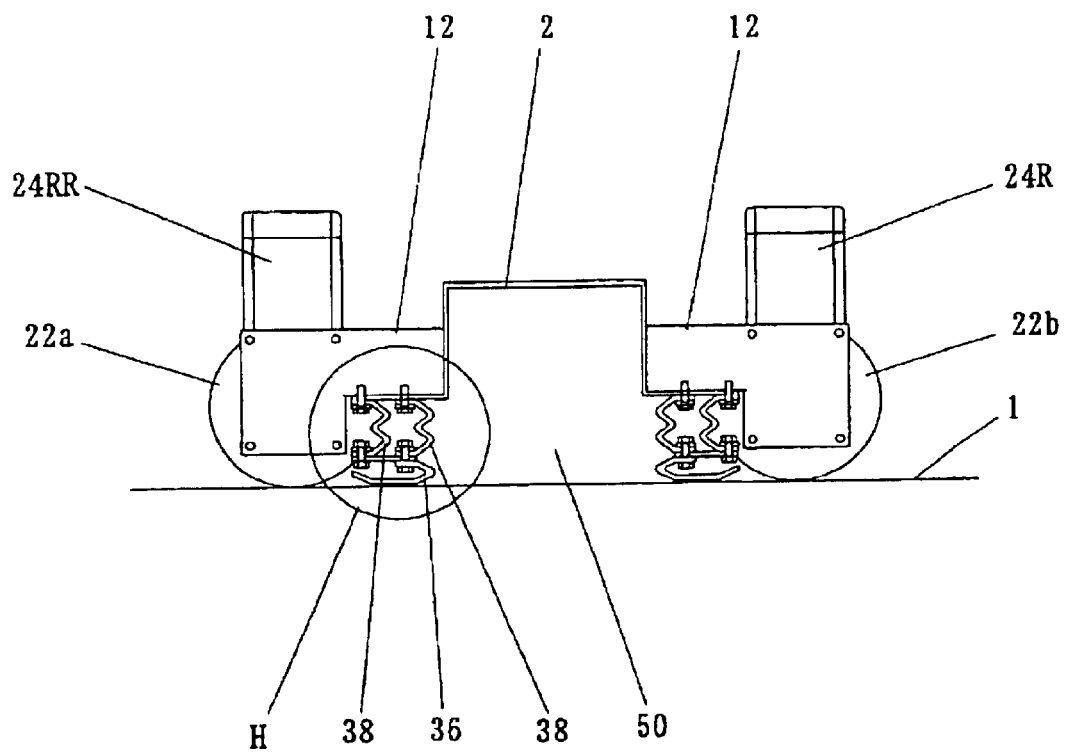
FIG. 17 is a sectional view of the second-most preferred embodiment of the device configured according to the present invention.

FIG. 17 shows a sectional view of the second-most preferred embodiment of the device configured according to the present invention. A top view of said second-most preferred embodiment is omitted because it is the same as the top view of the most preferred embodiment of the device configured according to the present invention shown in FIG. 1. FIG. 17 then is a sectional view along A—A of the second-most preferred embodiment of the device configured according to the present invention shown in FIG. 1.

Figure 18:
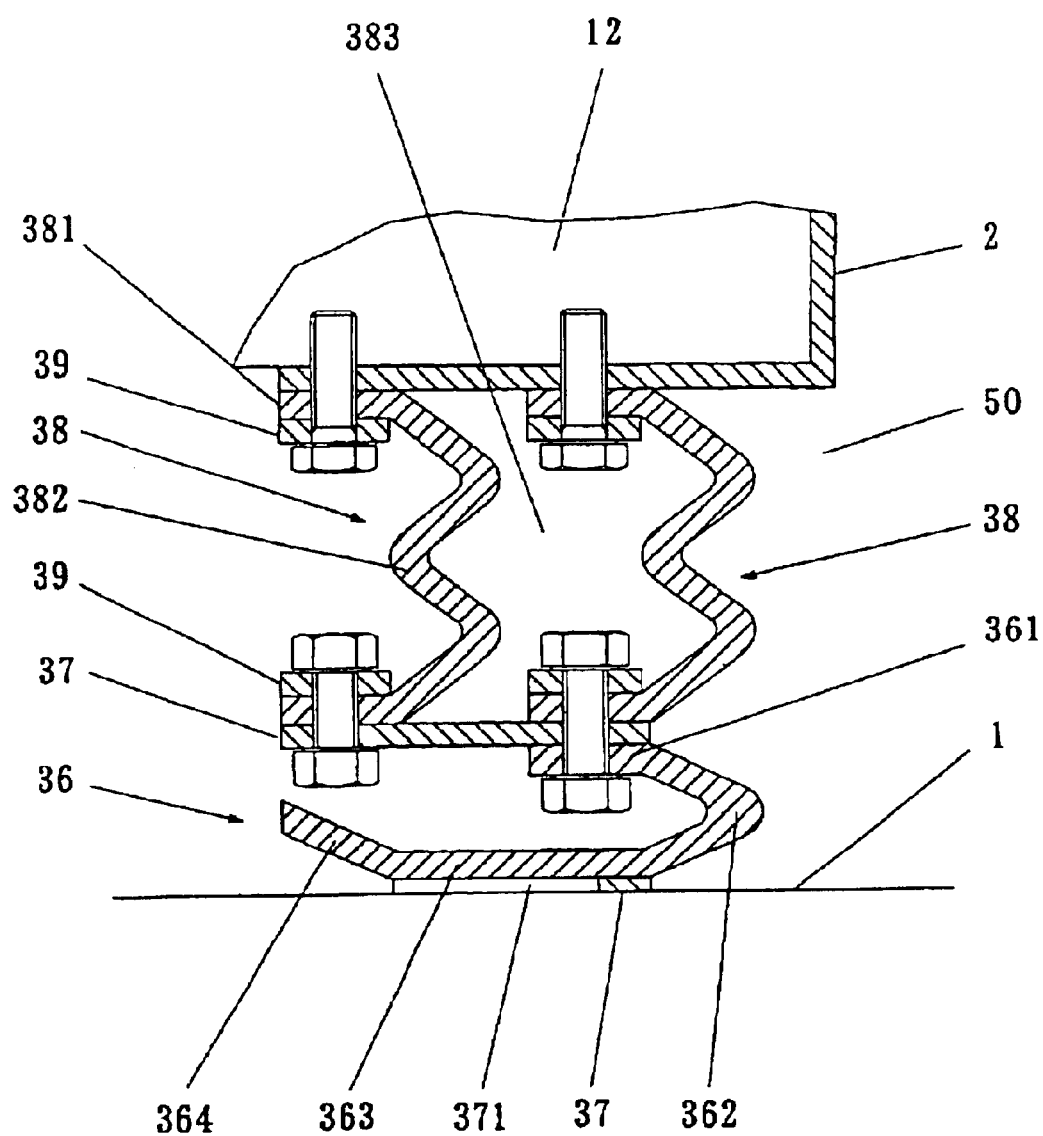
FIG. 18 is an enlarged sectional view of the area H of the device shown in FIG. 17.
Figure 19:
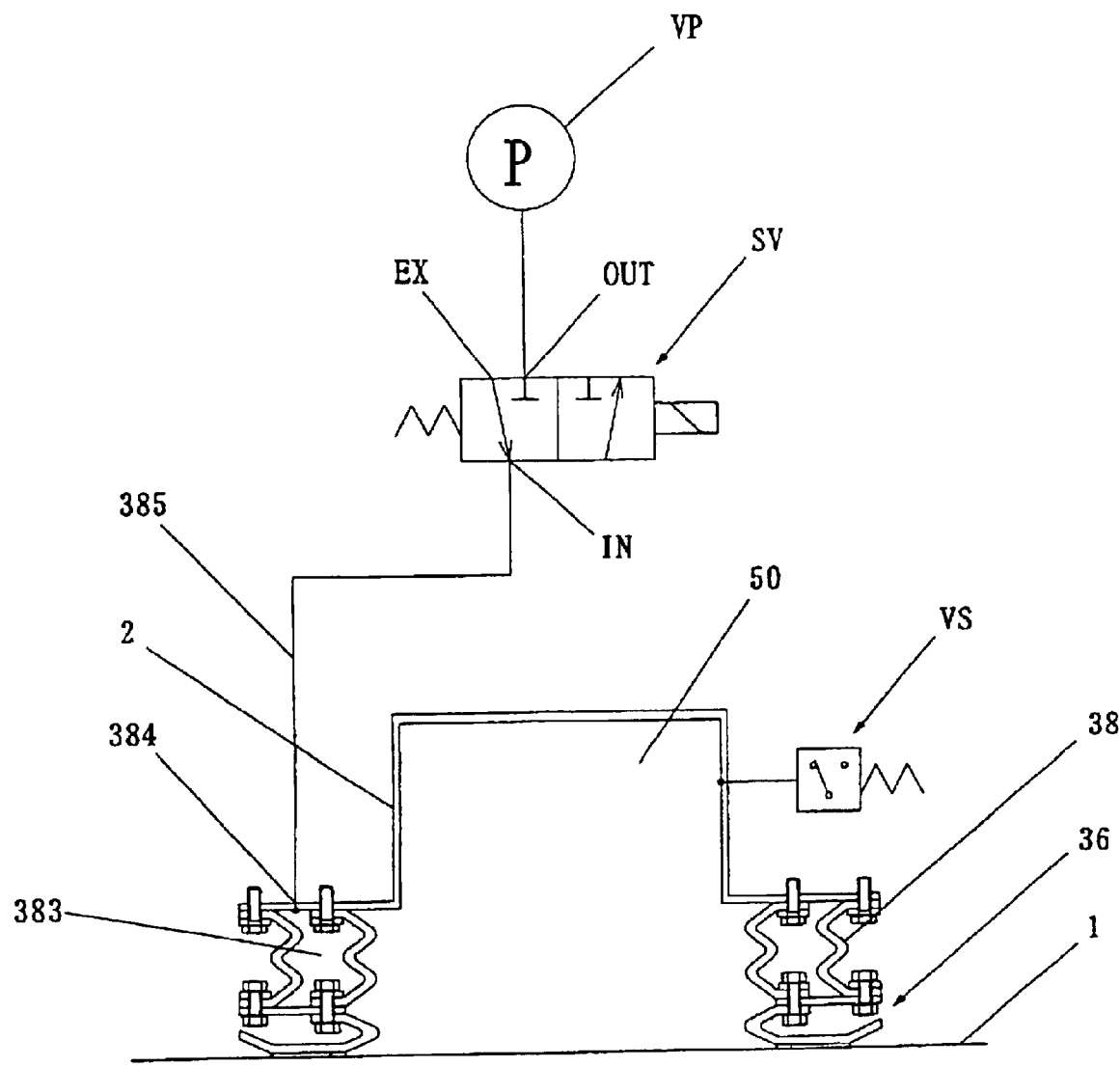
FIG. 19 is a pneumatic circuit diagram of the device shown in FIG. 17 and FIG. 18.

In reference to FIG. 17 through FIG. 19, the device illustrated therein has the suction housing 2, said suction housing 2, made of a rigid material, made up of a cylinder with one end opened and a ring-shaped disk welded onto the outer periphery of such opening of the cylinder.

Welded onto one side of the suction housing 2 is the connecting pipe 10a, said connecting pipe 10a being connected to a negative pressure forming means (not illustrated), such as a vacuum pump, via flexible suction hose (not illustrated).

Welded onto the sides of the suction housing 2 are two sets of installation members for electric motors with reduction gears 12, made of a rigid material.

Mounted on each of the two sets of installation members for electric motors with reduction gears 12 are the electric motor with a reduction gear 24RR having the driving wheel 22a on the driving shaft thereof and the electric motor with a reduction gear 24LL having the driving wheel 22c on the driving shaft thereof, on the one hand, and the electric motor with a reduction gear 24R having the driving wheel 22b on the driving shaft thereof and the electric motor with a reduction gear 24L having the driving wheel 22d on the driving shaft thereof, on the other hand.

Mounted on the outer periphery of the disk of the suction housing 2 is the bellows 38 of the overall approximate shape of a ring made of a relatively flexible material, such as polyurethane rubber or plastic, using bolts and nuts and utilizing the ring-and-disk-shaped binder made of a rigid material 39 as a supplementary fastening means. The bellows 38 comprises the flanges 381 made on both ends of the bellows 38 and the main part of the bellows 382.

Mounted on the bellows 38 is the outer periphery of the movable pressure-receiving member 37, which is a ring-shaped disk made of a rigid material, using a bolt and nuts and utilizing the binder made of a rigid material 39, which is ring-shaped disk, as a supplementary fastening means.

Additionally mounted on the disk part of the suction housing 2, closer to the center of the pressure reduced area 50 than where the aforementioned bellows 38 is mounted, is another set of bellows 38 having the same sectional shape as the aforementioned bellows 38, using bolts and nuts and utilizing the ring-and-disk shaped binders 39, made of a rigid material, as a supplementary fastening means.

As easily understood by FIG. 17, the two sets of bellows 38 are concentrically shaped.

The two sets of bellows 38 are each mounted on the outer and the inner peripheries of the ring-and-disk shaped movable pressure-receiving member 37, made of a rigid material, using bolts and nuts and utilizing the ring-and-disk shaped binders 39, made of a rigid material, as a supplementary fastening means.

The two sets of bellows 38, together with the suction housing 2 and the movable pressure-receiving member 37, define the second pressure-reduced area 383.

Mounted at the inner periphery of the movable pressure-receiving member 37 is the suction opening member 36, made of a relatively flexible material, such as polyurethane rubber or plastic, with bolts and nuts. The suction opening member 36, which has the overall approximate shape of a ring-shaped disk as is the case with the device shown in FIG. 1 through FIG. 16, comprises the flange 361, the bellows 362 consisting of the upper wall which extends from the flange 361 toward the surface of an object 1 and toward the inside of the pressure-reduced area 50 and the lower wall which extends from said upper wall toward the surface of an object 1 and toward the outside of the pressure-reduced area 50, the main part 363 which extends from the bellows 362, along the surface of an object 1 and toward the outside of the pressure-reduced area 50, and the extension 364 which extends from the main part 363, away from the surface of an object 1 and toward the outside of the pressure-reduced area 50.

The suction opening member 36, together with the suction opening 2, the bellows 38, the movable pressure-receiving member 37 and the surface of an object 1, defines the pressure-reduced area 50.

Pasted onto the area which faces the surface of an object 1 of the main part 363 of the suction opening member 36 is a sheet-shaped groove-forming member 37 made of a material with a low coefficient of friction, such as ultrahigh molecular polyethylene, as is the case with the device shown in FIG. 1 through FIG. 16. Detailed descriptions of the groove-forming member 34 are omitted as they are the same as those of the device shown in FIG. 1 through FIG. 16.

In FIG. 19, the second pressure-reduced area 383 is in communication with the IN port of a 3-port 2-position solenoid valve via hose 385. The OUT port of the solenoid valve is in communication with the suction inlet of a vacuum pump. The EX port of the solenoid valve is in communication with the outside of the pressure-reduced area 50.

In communication with the pressure-reduced area 50 is a vacuum switch which will be turned on if and when the negative pressure of the pressure-reduced area 50 increases and exceeds a predetermined value, and, by the action of the vacuum valve, the solenoid of the solenoid valve is not exited when the negative pressure of the pressure-reduced area 50 is below the predetermined value and is excited when the negative pressure of the pressure-reduced area 50 exceeds the predetermined value.

Figure 20:
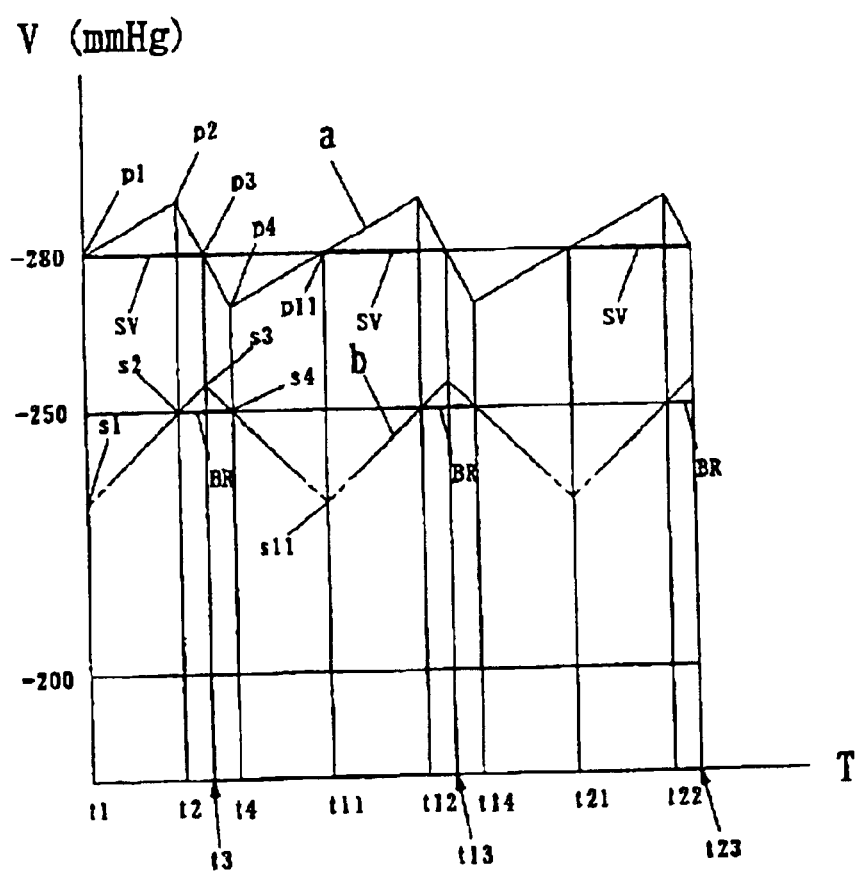
FIG. 20 shows fluid pressure changes of the pressure-reduced area and the second pressure-reduced area, the energized state of the solenoid valve and the state of detachment of the main part of the suction opening member from the surface of an object of the device shown in FIG. 17 through FIG. 19.

In FIG. 20, the vertical axis shows the degree of vacuum of the pressure-reduced area 50 and the second pressure-reduced area 383, and the horizontal axis shows the passage of time. The curve a shows the degree of vacuum of the pressure-reduced area 50, and the curve b shows the degree of vacuum of the second pressure-reduced area 383. The thick line SV shows the state of excitement of the solenoid of the solenoid valve, and the thick line BR shows the state of detachment, from the surface of an object 1, of the area of the main part 363 of the suction opening member 36 closest to the inside of the pressure-reduced area 50.

Actions and effects of the device described above will be explained below referring to the FIG. 17 through FIG. 20.

When the electric motors with reduction gears 24L, 24LL, 24R and 24RR are operated to rotate and drive the driving wheels 22d, 22c, 22b and 22a in the same direction, the device will move straight (forward or backward) along the surface of an object 1. When the driving wheels 22d and 22c, on one hand, and the driving wheels 22b and 22a, on the other hand, are rotated and driven to opposite directions, the device will turn (left or right).

When the negative pressure forming means (not illustrated) is energized, the fluid, such as air, inside the pressure-reduced area 50 becomes discharged externally through the connecting pipe 10a and suction hose (not illustrated), resulting in the desired reduction of the pressure of the pressure-reduced area 50.

When the pressure is so reduced of the pressure-reduced area 50, the pressure of the ambient fluid, such as air, which acts on the suction housing 2 due to the fluid pressure difference between the inside and the outside of the pressure-reduced area 50, is transmitted to the surface of an object 1 via the two sets of installation members 12 for the electric motors with reduction gears, the four sets of electric motors with reduction gears 24R, 24L, 24RR and 24LL and the four sets of driving wheels 22a, 22c, 22b and 22d, causing the device to suction-adhere to the surface of an object 1 due to the pressure of the ambient fluid.

While the pressure of the inside of the pressure-reduced area 50 is maintained at a desired level, the main part 363 of the suction opening member 36 is forced to be in firm contact with the surface of an object 1 by the pressure of the outside of the pressure-reduced area 50, thereby stopping as much as possible the fluid outside the pressure-reduced area 50 from flowing internally.

Many grooves are formed in the area of the main part 363 which faces the surface of an object 1. More specifically, the groove 371 which communicates with the outside of the pressure-reduced area 50 and the groove 372 which communicates with the inside of the pressure-reduced area 50 are formed alternately. The groove 372 is constantly in the state of negative pressure, and therefore, the main part 363 is necessarily pushed against the surface of an object 1 by the pressure of the fluid outside the pressure-reduced area 50.

When the second pressure-reduced area 383 is in communication with the outside of the pressure-reduced area 50, the movable pressure-receiving member 37 does not receive the force of being moved away from the surface of an object 1 nor does it receive the force of being moved closer to the surface of an object 1, and stays in the state of neutrality.

When the negative pressure of the inside of the pressure-reduced area 50 increases and exceeds a predetermined level, the contact point of the vacuum switch is turned on, exciting the solenoid of the solenoid valve, allowing the second pressure-reduced area 383 to be in communication with the vacuum pump (at those points in time t1, t11 and t 21 in FIG. 20).

The movable pressure-receiving member 37 is then forced to move away from the surface of an object 1 by the pressure of the fluid outside the pressure-reduced area 50.

The movable pressure-receiving member 37 then pulls the bellows 362 of the suction opening member 37 away from the surface of an object 1, finally resulting in the area of the main part 363 of the suction opening member 36 closest to the inside of the pressure-reduced area 50 being detached from the surface of an object 1 (at those points in time t2, t12 and t22 in FIG. 20).

The fluid outside the pressure-reduced area 50 is now caused to flow inside the pressure-reduced area 50 via the groove 371, stopping the negative pressure of the inside of the pressure-reduced area 50 from increasing. When the pressure of the inside of the pressure-reduced area 50 returns to the desired level, the contact point of the vacuum switch is turned off, stopping the excitement of the solenoid of the solenoid valve, thereby allowing the second pressure-reduced area 383 to be in communication with the outside of the pressure-reduced area 50 again (at those points in time t3, t13 and t23 in FIG. 20).

By the actions of the restoring force of the two sets of bellows 38 which attempt to return to the original shape and the pulling force of the suction opening member 36 which receives the pushing force toward the surface of an object 1, the movable pressure-receiving member 36 then moves toward the surface of an object 1, returning to the same state as when the pressure of the inside of the pressure-reduced area 50 was maintained at the desired level (at those points in time t4 and t14 in FIG. 20).

The above-described mode of the second most preferred embodiment is somewhat different from that of the most preferred embodiment, but the former achieves similar effects to those of the latter.

Preferred embodiments of the device of the present invention were described above. In addition to the preferred embodiments, there may be various other embodiments of the device of the present invention within the scope of the claims made herein.

For example, according to the preferred embodiments described above, the main part of the suction opening member is detached from the surface of an object by the action of the pressure outside the pressure-reduced area due to the fluid pressure difference between the inside and the outside of the pressure-reduced area, i.e., by the action of the pressure which causes it to move away from the surface of an object, but such detachment from the surface of an object may be caused by the action of an actuator, such as a pneumatic cylinder.

Further according to the preferred embodiments described above, the main part of the suction opening member has a sheet-shaped groove-forming member pasted on the area which faces the surface of an object, but the suction opening member and the groove-forming member may be formed in one piece.

Further according to the preferred embodiments described above, the suction opening member and the movable pressure-receiving member are separate members, but they may be formed in one piece.

Further according to the preferred embodiments described above, a sheet-shaped groove-forming member is pasted onto the area, which faces the surface of an object, of the main part of the suction opening member, but the area which faces the surface of an object of the main part of the suction opening member may not necessarily have grooves formed thereon.

Further according to the preferred embodiments described above, a part of the main part of the suction opening member is detached from the surface of an object, but the device may be so configured that the entire main part is detached.

Further according to the preferred embodiments described above, the suction opening member is of an approximate ring shape of a ring and comprises the flanges, the bellows consisting of the upper wall which extends from the flanges toward the surface of an object and toward the inside of the pressure-reduced area and the lower wall which extends from said upper wall toward the surface of an object and toward the outside of the pressure-reduced area, the main part which extends from the bellows, along the surface of an object and toward the outside of the pressure-reduced area, and the extension which extends from the main part away from the surface of an object and toward the outside of the pressure-reduced area, but, depending upon the purpose of the use of the device of the present invention, a simple cylindrical shape will be acceptable. Further, depending upon the purpose of the use of the device of the present invention, the suction opening member may be made of a rigid material instead of a flexible material.

The descriptions above of the preferred embodiments of the device of the present invention assumed that the device of the present invention existed on the surface of an object in the atmosphere, but the device of the present invention may be applied underwater. In such a case, a water pump or a water-driven ejector, instead of a vacuum pump, may be used as a negative pressure forming means.

The device of the present invention is capable of effectively sucking in and transporting materials which exist on the surface of an object, whether existing inside or outside the pressure-reduced area because, according to the device of the present invention, the entire flow of the fluid which flows from outside the suction device, through the inside of the suction device and to the negative pressure forming means passes extremely close to the surface of an object.

The device of the present invention is capable of effectively sucking in and transporting materials because, according to the device of the present invention, the suction opening member is detached from the surface of an object, i.e., the surface of a material to be sucked in and transported, due to the increase in the negative pressure of the inside of the suction nozzle, i.e., a suction device, stopping excessive flow of such material into the suction opening member before such material is blocked up in the midst of its transportation route.

The device of the present invention is capable of effectively sucking in and transporting materials because, according to the device of the present invention, the entire flow of the fluid which flows from outside the suction device, through the inside of the suction device and to the negative pressure forming means passes extremely close to the material to be sucked in and transported.

When the fluid suction capacity of a negative pressure forming means is considerably great, the device of the present invention is capable of easily stopping the increase in the negative pressure of the pressure-reduced area without using a large vacuum breaker as has traditionally been the case. The device of the present invention may be made smaller and lighter with reduced manufacturing cost, compared to traditional devices which use large vacuum breakers.

POTENTIAL INDUSTRIAL APPLICATIONS

The suction device having a negative pressure adjusting mechanism as described above may be conveniently used as a suction device of a device which utilizes negative pressure and works on the surface of an object for various purposes. Further, this invention may be applied to such a device capable of adhering to the surface of an object, such as a wall surface or a ceiling surface, by utilizing negative pressure and of moving along such surface as is disclosed in U.S. Pat. No. 1,323,843, and may be conveniently used as a device which conducts peeling work of old painted film off, and painting work on, the surface of large structures, such as ships' hulls, various tanks and buildings, as well as underwater cleaning work of ships' bottoms.

What is claimed is:

1. A suction device comprising:
a suction housing connected to a negative pressure forming means to suck in a fluid;
a suction opening member installed on said suction housing, a part of which is caused to contact the surface of an object, and which defines a pressure-reduced area together with said suction housing and said surface of an object; and,
a means for maintaining the distance between said suction housing and said surface of an object at a predetermined distance;
said suction device having a negative pressure adjusting means whereby said suction opening member and said surface where in contact with each other become detached from each other partially or entirely due to the increase in the fluid pressure difference between the inside and the outside of said pressure-reduced area, resulting in the communication between the inside and the outside of said pressure-reduced area, allowing the outside fluid to flow into said pressure-reduced area.

2. The device of claim 1, wherein:
such detachment caused by the increase in the fluid pressure difference between the inside and the outside of said pressure-reduced area is then cancelled due to the cancellation of the increase in the fluid pressure difference between the inside and the outside of said pressure-reduced area, canceling the communication between the inside and the outside of said pressure-reduced area, thereby stopping the outside fluid from flowing into said pressure-reduced area.

3. The device of claim 2, wherein:
the opening, through which the inside and the outside of said pressure-reduced area are in communication with each other, is caused to increase as the fluid pressure difference between the inside and the outside of said pressure-reduced area increases, and is caused to decrease as the increase in said fluid pressure difference is cancelled.

4. The device of claim 3, further comprising:
a means for causing said suction opening member and said surface of an object where in contact with each other to detach from each other partially or entirely due to the increase in the fluid pressure difference between the inside and the outside of said pressure-reduced area.

5. The device of claim 4, further comprising:
a means for causing such area of detachment between said suction opening member and said surface of an object to return to the original contacted state due to the cancellation of the increase in the fluid pressure difference between the inside and outside of said pressure-reduced area.

6. The device of claim 5, further comprising:
a means for causing said suction opening member to move away from said surface of an object due to the increase in the fluid pressure difference between the inside and the outside of said pressure reduced area.

7. The device of claim 6, further comprising:
a means for causing said suction opening member to move toward said surface of an object due to the cancellation of the increase in the fluid pressure difference between the inside and the outside of said pressure-reduced area.

8. The device of claim 7, wherein:
said suction opening member is mounted onto a movable pressure-receiving member which receives the force of being moved away from said surface of an object due to the fluid pressure difference.

9. The device of claim 8, wherein:

said movable pressure-receiving member is a movable pressure-receiving member capable, at a predetermined time, of receiving the force of being moved toward said surface of an object due to the fluid pressure difference.

10. The device of claim 9, further comprising:

a means for maintaining airtight connection between said movable pressure-receiving means and said suction housing while relative positions of said movable pressure-receiving member and said suction housing may change.

11. The device of claim 10, further comprising:

a means for adjusting the force which moves said movable pressure-receiving member away from or toward said surface of an object.

12. The device of claim 11, further comprising:

a means for causing said movable pressure-receiving member to move toward said surface of an object due to the cancellation of the increase in the fluid pressure difference between the inside and the outside of said pressure-reduced area.

13. The device of claim 12, wherein:

said suction opening member at least comprises a part which is connected to the suction housing directly or indirectly via another member, a part which extends from such connected part toward said surface of an object and the part which contacts said surface of an object, said suction opening member being made of a flexible material.

14. The device of claim 13, wherein:

grooves which communicate with the outside of said pressure-reduced area are formed at the part of said suction opening member which contacts said surface of an object, said grooves causing the inside and the outside of said pressure-reduced area to communicate with each other due to the increase in the fluid pressure difference between the inside and the outside of said pressure-reduced area.

15. The device of claim 13, wherein:

grooves which communicate with the outside of said pressure-reduced area and grooves which communicate with the inside of said pressure-reduced area are formed at the part of said suction opening member which contacts said surface of an object, such grooves which communicate with the outside of said pressure-reduced area causing the inside and the outside of said pressure-reduced area to communicate with each other due to the increase in the fluid pressure difference between the inside and the outside of said pressure-reduced area.

16. The device of claim 15, wherein:

the size of the passage of the grooves which communicate with the outside of said pressure-reduced area is caused to increase as the fluid pressure difference between the inside and the outside of said pressure-reduced area increases, and the size of said passage is caused to decrease as such increase in the fluid pressure difference is cancelled.

17. The device of claim 16, wherein:

at least two different lengths of grooves which communicate with the outside of said pressure-reduced area are formed.

18. The device of claim 17, wherein:

one or more sheet-shaped groove-forming member or members having one or more grooves is or are pasted onto the part of said suction opening member which contacts said surface of an object for the purpose of forming such groove or grooves thereon.

19. The device of claim 18, wherein:

said suction device has a moving means to move along said surface of an object.

20. The device of claim 19, wherein:

the means for maintaining the distance between said suction housing and said surface of an object at a predetermined distance simultaneously serving as the means for moving along said surface of an object.

* * * * *